United States Patent Office 3,530,673
Patented Sept. 29, 1970

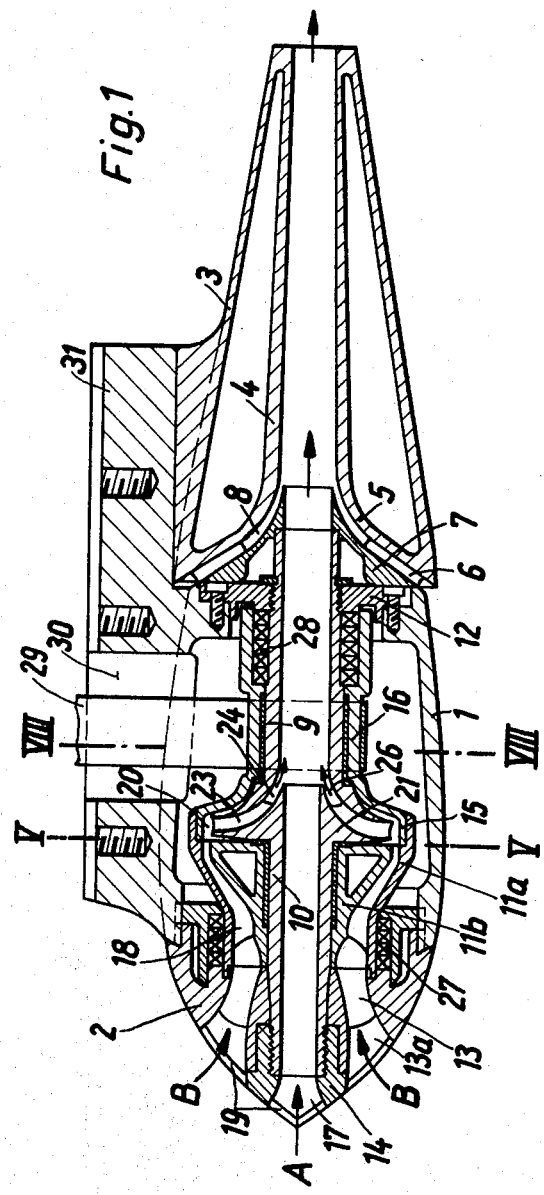
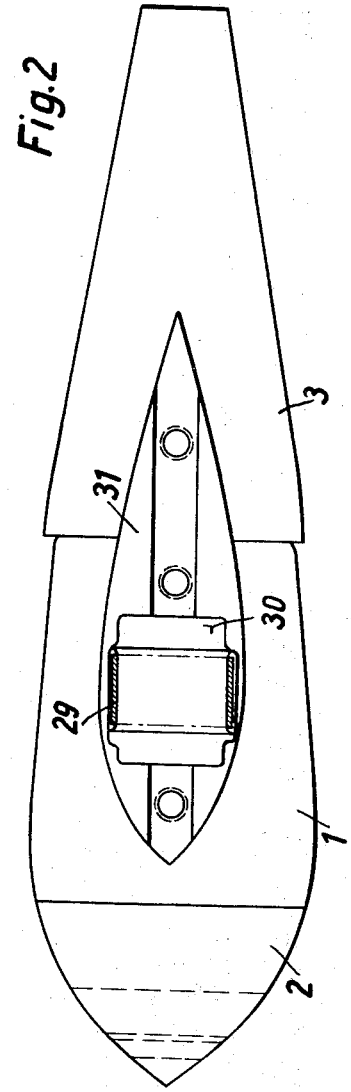

3,530,673
JET-PROPULSION UNITS FOR WATER CRAFT
Ludwig Huber, An der Langenfuhr 23,
Dormagen, Germany
Filed Dec. 31, 1968, Ser. No. 788,206
Int. Cl. B63h *11/00*
U.S. Cl. 60—221                              6 Claims

ABSTRACT OF THE DISCLOSURE

A water jet-propulsion unit for water craft of the kind in which the entering water is divided into a primary water stream accelerated by a rotary pump and at least one secondary water stream accelerated by the primary water stream has a pump with a rotor provided with blades which are curved forwards in the direction of rotation of the rotor and with a shroud ring which is fixed to the blades so that it rotates with them and extends beyond the blades in a downstream direction. The shroud ring is so dimensioned that, in operation, a ring of water is formed in it by the water issuing from the rotor blades and this ring of water rotates in the same direction as, but faster than the shroud ring and the water passes from the water ring into an exit guide device which has guide blades situated within the shroud ring. The exit guide device guides the water from the rotating water ring inwards and rearwards through a jet stream pipe from which the propulsion jet of water issues.

---

This invention relates to water jet-propulsion units for water craft of the kind in which the entering water is divided into a primary water stream which is accelerated by a rotary pump and at least one secondary water stream which is accelerated by the primary water stream.

Such jet-propulsion units have already been proposed in various forms. Thus multi-stage, axial-flow turbo-machines are known for the propulsion of ships and for the conveying of liquids, in which a part of the output of a fast-running inner primary impeller is transmitted hydraulically by way of a turbine wheel to a slow-running outer secondary impeller, while a part of the total flow of the liquid flows through both impellers. The primary impeller acts upon a multi-stage turbine rotor, while fixed guide devices are provided between the pump stages and turbine stages.

Apart from the fact that such machines necessitate considerable expense for components and furthermore the thrust loadings and impeller rotation speeds which occur cause extraordinarily harmful cavitation phenomena on the transition to high water craft speeds, these drive units did not fulfill the requirements which are made of them.

In all gas-operated and liquid-operated jet-propulsion mechanisms the maximum efficiency is achieved when the outflow speed of the jet fluid is only slightly greater than the forward speed of the driven vehicle. In the case of a water-operated jet-propulsion unit for the drive of water craft, the speed ranges of which are much smaller than those of aircraft, it is therefore of particular importance that the outflow velocity of the water jet should be in each case in the relationship to the speed of the craft corresponding to the maximum efficiency, in order to achieve optimum power output.

None of the water-operated jet-propulsion units which are known so far conforms even only approximately with this basic requirement, for in these the water is first brought to a high pressure by conventional rotary pumps, and this pressure is then converted into velocity in the jet pipe.

The disadvantage of such units consists in the double change of state of the conveyed water within the pump and the jet pipe, which involves a great loss of efficiency, and also in the large dimensions and weights inherent in these units, which necessarily require their accommodation within the hull of the craft. Thus in all cases relatively long conduits become necessary for the supply and withdrawal of the propellant water upstream and downstream of the pump. Moreover when the units are arranged within the ship's hull, the propellant water must overcome a certain suction height from the hull entry to the pump inlet, resulting in further disadvantageous lossees of efficiency, so that the known jet-propulsion units hardly achieve the power range of conventional ships screws. Therefore it appeared uneconomical in most cases hitherto to use water-operated jet-propulsion units in place of conventional ship's screws.

It has also appeared that the use of conventional rotary pumps with rearwardly curved rotor blades is fundamentally unsuitable for the operation of water craft with high forward speeds, since with increasing forward speed the relative velocity of the propellant water in the rotor increases, so that the exit guide device is charged with too high a velocity of flow. A very important disadvantage occurs here when the speed of inflow of the water approaches the peripheral velocity of the inner edges of the blades, for then the axially inflowing propellant water in its deflection into a radial direction of flow is no longer grasped by the inner tips of the blades which rotate too slowly in relation to the radial flow so that an impingement pressure is exerted by the water upon the backs of the blades and these work as turbine blades. On the occurrence of such a critical condition the output of the pump and thus the thrust output of the drive unit fall off greatly, so that with such units it is possible to achieve only maximum speeds which do not go appreciably beyond the maximum speeds achievable by propeller propulsion. Since the thrust output of a jet-propulsion unit is dependent solely upon the outflow velocity of the drive fluid and its mass, the double changes of state of the propellant water occurring in the known apparatus constitute a disadvantage as a result of the conversion losses involved, and there are no corresponding compensating advantages. Furthermore, due to the fact that the water must flow over stationary pump housing walls, considerable friction and curvature losses occur.

According to this invention, in a jet-propulsion unit of the kind described, the pump has a rotor provided with blades which are curved forwards in the direction of rotation of the rotor and with a shroud ring which extends beyond the blades in a downstream direction, the shroud ring being so dimensioned that, in operation, a water ring is formed in it by the water issuing from the rotor blades, the water ring leading, and rotating in the same direction as the shroud ring, and an exit device, which has guide blades within the shroud ring, continuously dividing off the inner zone of the rotating water ring and guiding it inwards and rearwards and through a jet stream pipe.

With this arrangement, the primary water stream passes directly, utilising its inflow energy, into the rotary pump and it is conducted with the velocity of flow thus effected into the jet pipe where it accelerates the remaining part of the propellant water, that is the secondary stream or streams, by an injector effect.

According to a further feature of the invention, an entry tube and the jet stream pipe are arranged coaxially within the pump and support the guide device. The secondary water stream, or one of the secondary water streams, flows through the entry tube and is accelerated by an injector effect of the primary water stream ejected with a higher velocity of flow from the exit guide device.

This leads to a further increase of efficiency as the entry tube is subjected to a ram pressure effect caused by the passage of the unit through the surrounding water.

The advantages of the jet-propulsion unit in accordance with the invention consist firstly in that only a part of the total quantity of propellant water, that is the primary water stream, runs through the pump, so that substantially smaller dimensionings of the blading and thus also of the rotor diameter occur. Moreover the retardation of the primary water stream flowing with high velocity of flow out of the exit guide device into the secondary water stream effects a positive regulation of the outflow velocity of the total quantity of propellant water through the end of the jet stream pipe in order to achieve an optimum thrust output.

Thus the invention leads to a jet-propulsion unit by means of which, avoiding the disadvantages which have been described, of known propulsion units, great thrust outputs and high speeds of travel can be achieved. A particular advantage of the propulsion unit in accordance with the invention consists in that even at maximum speed an excess of thrust output necessary for constant forward travel remains effective at the end of the jet stream pipe. It is a characteristic of the arrangement to bring the propellant water of the primary water stream without increasing its pressure in the rotor, by direct acceleration to a maximum velocity with a tangential exit from the rotor around the smooth inner wall of the rotating shroud ring, into a laminar annular flow rotating in the same direction, which flows against the blading of the exit guide device, enters the device without loss and is conducted directly into the jet stram pipe, after deflection in the guide device, for the purpose of producing an optimum reaction effect at the end of the jet stream pipe.

Since the guide blades of the exit guide device can be made with knife-edge entry edges and with a flat angle of incidence directed against the peripheral flow of the water ring, so that guide passages are produced which are shaped favourably to the flow for the further guidances and finally enter the jet pipe with a helical and axially directed course, such an arrangement ensures an impact-free and eddy-free reception of the primary stream to establish a continuity of flow between the entry of the water which forms the water ring and the withdrawal of the water through the exit guide device.

Since the rotor of the jet-propulsion unit in accordance with the invention transmits only velocity energy, that is to say it runs as a constant-pressure machine, relatively small diameters are needed for the rotor, while the constant pressure effect is further favoured by the forwardly curved blading.

In the case of an exit angle position of the rotor blades necessary for a tangential flow of water from the rotor, the primary water stream velocity on leaving the rotor is approximately equal to the peripheral velocity of the rotor, so that the two velocities combine vectorially into an absolute velocity of the water emitted by the rotor which is approximately equal to twice the periphery velocity of the rotor. If a water current departing tangentially from the rotor were to enter a stationary shroud ring with this high velocity, as is always the case in known rotary pumps with stationary shrouds high friction losses would occur which are reliably avoided by the invention.

By reason of the mounting of the pump rotor around the secondary water entry tube frequently only a tube bore of limited diameter is necessary for the secondary water, so that the thereby reduced volume of the secondary water stream is not sufficient to effect the above-mentioned retardation of velocity of the primary water stream. Therefore it is proposed according to a further feature of the invention to provide a second secondary water inflow stage. To this end, a slot is provided through which further secondary water stream is drawn in by an injector effect of the primary and secondary water streams leaving the jet stream pipe.

Thus every desired attunement between primary water quantity and secondary water quantity and between their relative velocities is possible.

In order to avoid any pipe conduit upstream and downstream of the jet propulsion unit, according to a further feature of the invention, by reason of the extraordinarily favourable spatial dimensions of the unit in accordance with the invention this can be accommodated in a streamlined housing situated outside the hull of the craft in the surrounding water. Apart from the advantage of practically loss-free conduction of the water, such an arrangement also renders possible a pivotable mounting of the unit for steering of the craft. Moreover this involves the advantage that the second secondary water inflow stage can be constructed in the form of an annular slot penetrating the housing and opening into the jet stream pipe.

In the case of relatively large ship units it is preferable to accommodate the propulsion unit together with its drive within the hull which is formed appropriately.

An example of a jet propulsion unit constructed in accordance with the invention is illustrated in the accompanying drawings in which:

FIG. 1 is a vertical axial section;

FIG. 2 is a plan;

Figure 3:
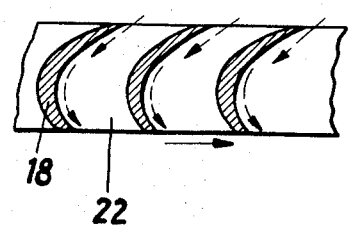
FIG. 3 shows a detail of the blading of a rotary pump forming part of the unit.

The unit comprises a streamlined housing 1 with a headpiece 2 and a tail-piece 3. A rearwardly conically tapering nozzle outlet pipe 4 is arranged in the tail-piece 3 and has a funnel-shaped entry 5 which is supported through connection webs 6 on a similarly funnel-shaped intermediate piece 7, so that a funnel-shaped annular gap 8 is produced.

A jet stream pipe 9, which forms an extension of an entry tube 10 and also forms the bearing seating for a pump rotor 11a, 11b, is arranged coaxially with the jet outlet pipe 4. The jet pipe 9 is supported by an annular flange 12 which is screwed to the housing 1 and takes up the axial thrust of the rotor 11a, 11b.

The entry tube 10, which is connected through webs 13 with the headpiece 2, is mounted upstream of the jet pipe 9 in the direction of entry of the secondary water flow A. A threaded bush 14 holds the parts 2 and 10 together. The jet stream pipe 9 and the entry passage 10 are formed as a supporting shaft, on which a rotary pump 15 is mounted, the pump 15 being formed by the rotors 11a, 11b, and a drive part 16. The central bore of the threaded bush 14 flares in an upstream direction to an inflow opening 17 for the secondary water A, which enters at the end of the drive unit, while the gap 8 receives further secondary water. The shaping of the parts 5, 7 and 9 to form an injector draws in this secondary water stream.

Entry openings 13a provided for the entry of primary water B in the headpiece 2 are in communication with the blades 18 of the rotor 11a, 11b. The entry openings 13a and 17 are protected by grids 19 against the entry of foreign bodies.

The rotor 11a, 11b, of the pump 15 is formed as a semi-axial pump rotor, the blading 18 of which comprises a form bent forwards in the peripheral direction, as represented in developed form in FIG. 3. In FIG. 3, the direction of rotation is indicated by a solid arrow and the water inflow direction is indicated by arrows in chain-dotted lines.

Figure 4:
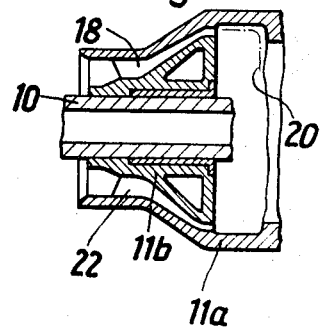
FIG. 4 is a vertical axial section to a larger scale through part of the pump showing the blade passages in the rotor.
Figure 5:
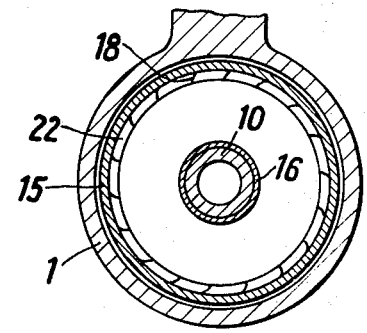
FIG. 5 is a cross-section on the line V—V in FIG. 1.

As shown in FIG. 1 the part 11a of the rotor, which forms a shroud is extended downstream beyond the blade ends in the axial direction in the manner of a shroud ring and joins a further shroud ring 20 which encloses with a radial clearance a stationary exit guide device 21. In FIG. 4 the entry of the rotor blade passages 22 into the shroud ring 20 is illustrated, while the exit guide device 21 arranged downstream of this is not illustrated. FIG. 5 shows the rotor in axial end view as seen from a downstream direction again with the exit guide device 21 omitted.

As appears from FIG. 4, the water is received by the guide blades 18 and deflected in the peripheral direction, whereupon it flows with an accelerated outflow velocity, which according to the angle of exit from the rotor passages 22 can correspond at a maximum to the peripheral velocity of the rotor, into the shroud ring 20 rotating therewith and forms therein a water ring leading the shrouded ring.

Figure 6:
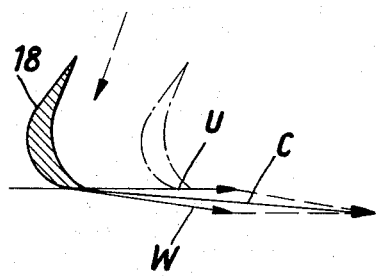
FIG. 6 is a vector diagram.

To clarify the flow actions which take their course here, a corresponding parallelogram of velocities shown in FIG. 6, in which the peripheral velocity of the rotor 11a, 11b is indicated by an arrow U, the relative or exit velocity of the water by W and the resultant absolute velocity, of the water by the arrow C.

The absolute velocity C is here composed of the peripheral velocity U of the shroud ring 20 and the velocity W of the water ring, with which the latter leads the rotation of the shroud ring and in its circular path flows against the blading 23 of the stationary exit guide device 21, while the inner annular zone of the water ring is continuously divided off by the guide blades 23 and is conducted away through guide passages 23 (see FIG. 7) inwards and rearwards as a hollow jet by way of the donwstream end of the entry passage into the jet stream pipe 9. The accelerated primary water is here united in injector fashion with the secondary water flowing in through the entry passage 10, with a simultaneous equalisation of the velocities of flow.

Figure 7:
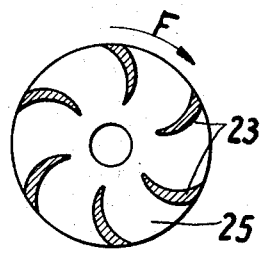
FIG. 7 is a cross-section showing a pump outlet guide.
Figure 8:
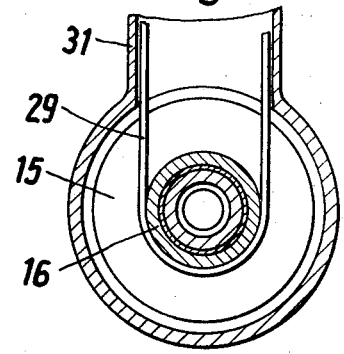
FIG. 8 is a cross-section on the line VIII—VIII of FIG. 1.

In the example illustrated, the exit guide device 21 is arranged at the point of transition of the entry passage 10 into the jet stream pipe 9 and is formed in a similar manner to the intermediate piece 7 ending at the ends 24 of the passages 25. The guide blades 23 represented in FIG. 7 connect the exit guide device 21 with the oppositely directed entry funnel of the jet stream pipe 9, forming the guide passages 25, so that the propellant water flow which enters smoothly and continuously is subjected in the chamber 26 formed by the ends 24 of the passages 25, to the injector suction effect. In FIG. 7, where the exit guide device 21 is illustrated, an arrow F shows the direction of rotation of the water ring, from which it can be seen that the guide blades 23 are curved counter to the water rotation direction.

In its upstream part the rotor is mounted at 27 in the headpiece 2, while the drive part 16 is rotatably supported at 28 on the jet stream pipe 9. As appears especially from FIG. 1, the drive part 16 of the rotary pump 15 which is firmly connected to the rotor 11a, 11b serves firstly for the mounting of the rotor on the jet stream pipe 9, and secondly as a driving wheel. While the drive can be effected through bevel or spur wheel gearing, in the example illustrated a toothed belt 29 drives off the rotor. The belt 29 extends through a passage 30 in a pedestal 31 by which the propulsion unit is mounted on the hull of the craft. The belt 29 extends around the drive part 16 which forms a belt pulley.

I claim:
1. In a water jet-propulsion unit for water craft including means for dividing water entering said unit into a primary water stream and at least one secondary water stream, a rotary pump for accelerating said primary water stream and means for causing said primary water stream to accelerate said at least one secondary water stream, the improvement wherein said pump includes a rotor, blades on said rotor, said blades being curved forwards in the direction of rotation of said rotor, a shroud ring encircling said blades and extending beyond said blades in a downstream direction, said shroud ring being so dimensioned that, in operation, a water ring is formed in said shroud ring by water issuing from said blades, said water ring leading and rotating in the same direction as said shroud ring, an exit guide device, said device including guide blades and means mounting said guide blades to extend within said shroud ring, a jet stream pipe and means mounting said jet stream pipe downstream of said exit guide device, said exit guide device continuously dividing off an inner zone of water in said rotating water ring and guiding said water inwards and rearwards through said jet stream pipe.

2. A unit as claimed in claim 1, further comprising an entry tube and means mounting said entry tube coaxially within said rotor of said pump and coaxially with said jet stream pipe, and means supporting said exit guide device on said entry tube and said jet stream pipe.

3. A unit as claimed in claim 2, wherein one of said at least one secondary water streams flows through said entry tube and further comprising injector means for accelerating said secondary water stream flowing through said entry tube by an injector effect of said primary water stream issuing from said exit guide device.

4. A unit as claimed in claim 3, further comprising means defining an annular slot at the downstream end said jet stream pipe, injector means and means mounting said injector means at the downstream end of said jet stream pipe whereby a further secondary water stream is drawn in through said annular slot by an injector effect of said primary and secondary water streams leaving said jet stream pipe through said injector means.

5. A unit as claimed in claim 1, further comprising streamlined housing means enveloping said unit and means on said streamlined housing means for mounting said housing means on the outside of a hull of a craft.

6. In a water craft including a hull, a unit as claimed in claim 1 accommodated within said hull.

References Cited

UNITED STATES PATENTS

| | | | |
|---|---|---|---|
| 1,498,919 | 6/1924 | Jensen | 115—16 |
| 3,447,324 | 6/1969 | French | 60—221 |

CARLTON R. CROYLE, Primary Examiner

U.S. Cl. X.R.

103—5, 89, 262; 115—16